Oct. 22, 1929.　　　C. A. MULLEN　　　1,732,338
OVERLOAD INDICATOR FOR MEASURING INSTRUMENTS
Filed Oct. 24, 1928　　2 Sheets-Sheet 1
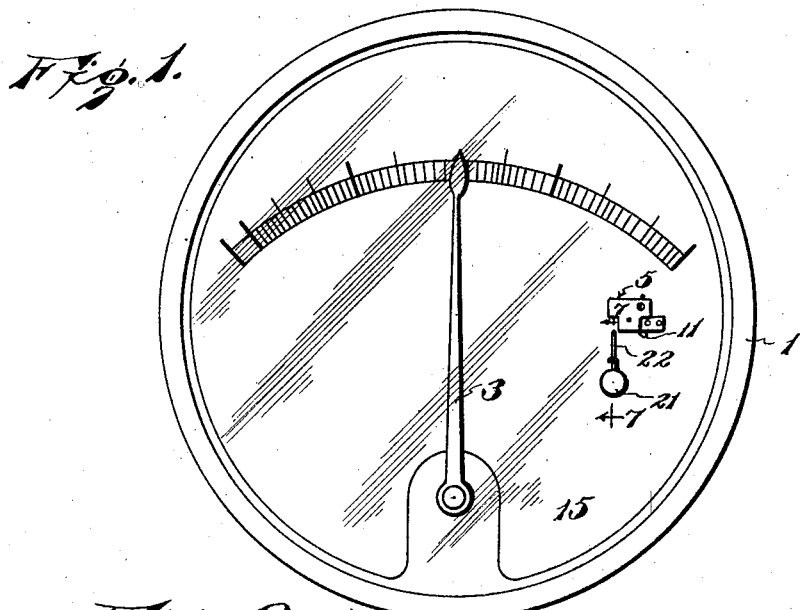
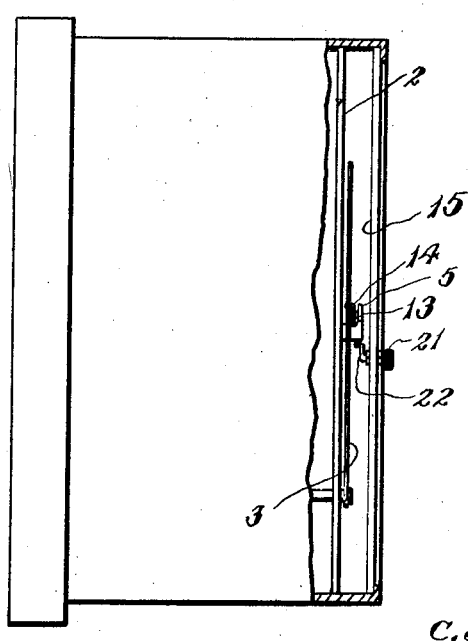
Inventor
C. A. Mullen
By Lacey & Lacey, Attorneys

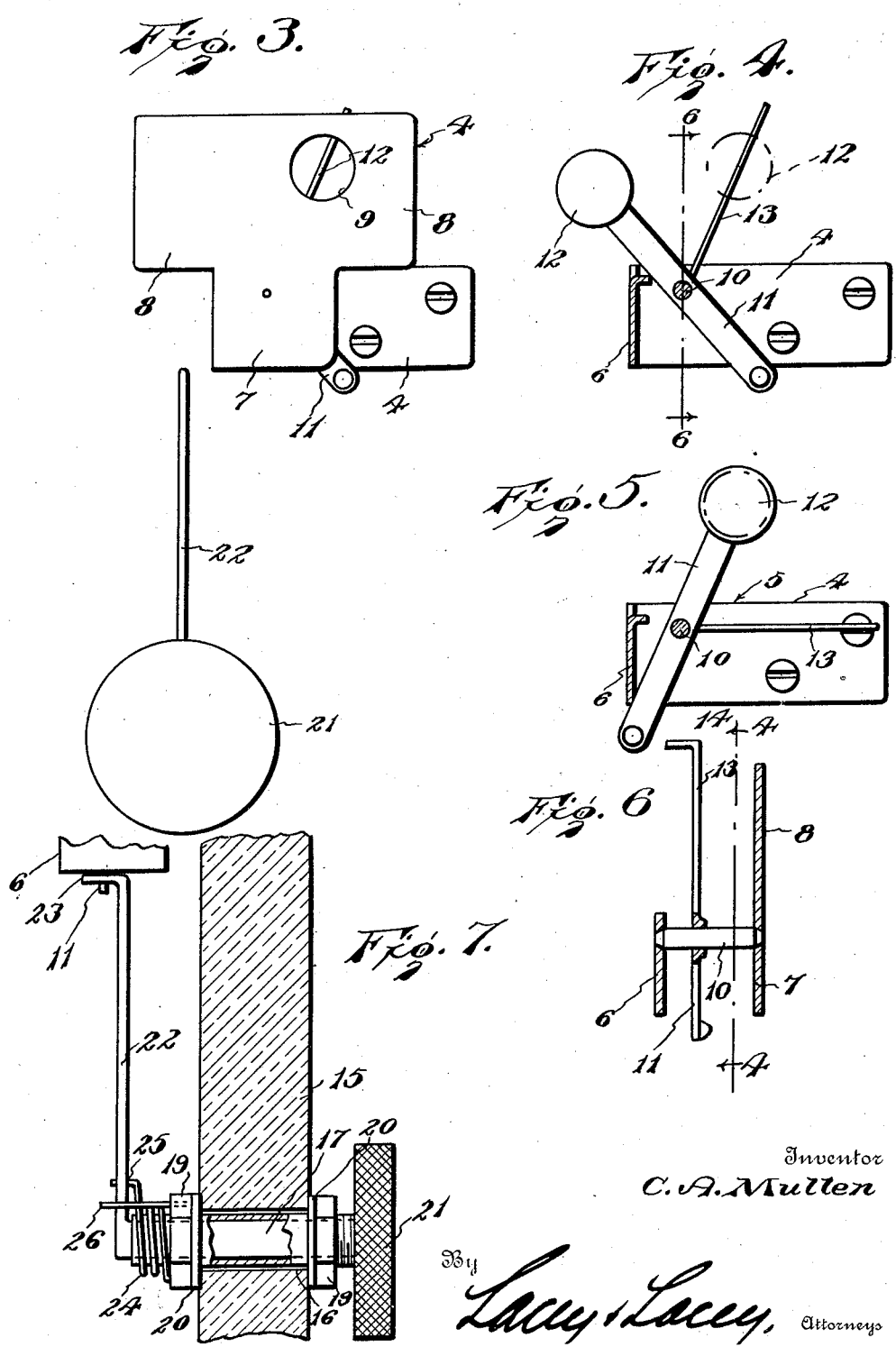

Patented Oct. 22, 1929

1,732,338

UNITED STATES PATENT OFFICE

CLYDE A. MULLEN, OF ASBURY PARK, NEW JERSEY

OVERLOAD INDICATOR FOR MEASURING INSTRUMENTS

Application filed October 24, 1928. Serial No. 314,779.

The present invention is directed to improvements in overload indicators for measuring instruments.

The primary object of the invention is to provide a device of this character especially designed for use in connection with switch board instruments, such as ammeters and wattmeters, or the like, the construction being such that when the pointer is shifted to a position beyond full scale, a target will be actuated to indicate that the pointer has been moved beyond the full scale position.

Another object of the invention is to provide novel means for resetting the target, the construction being readily accessible and will in no way interfere with the working parts of the instrument.

Another object of the invention is to provide a device of this character which is simple in construction, and can be installed upon instruments already in use.

With these and other objects in view, this invention resides in the novel features of construction, formation, combination and arrangement of parts to be hereinafter more fully described, claimed and illustrated in the accompanying drawings, in which:—

Figure 1 is a front view of an instrument showing the device in place thereon.

Figure 2 is a sectional view with parts broken away.

Figure 3 is a front view of the indicator, showing the relative arrangement of the frame and resetting arm.

Figure 4 is a sectional view on line 4—4 of Figure 6.

Figure 5 is a longitudinal sectional view through the frame showing the target in its operative position.

Figure 6 is a sectional view on line 6—6 of Figure 4.

Figure 7 is a sectional view on line 7—7 of Figure 1.

Referring to the drawing, 1 designates the instrument which may be of any well known type and includes the usual dial 2 having a scale thereon and a pointer 3 adapted to travel over the scale.

Suitably fixed to the dial 2 is a back plate 4 of a frame 5, said plate having an end plate 6 which supports the front plate 7 in spaced relation with respect thereto, the latter plate having an enlarged plate 8 carried thereby and in which is formed a sight opening 9, the purpose of which will be later explained.

Journaled between the plates 6 and 7 is a shaft 10, said shaft having fixed thereto an arm 11, the upper end of which carries a target 12 colored white.

The lower end of the arm 11 extends slightly below the frame 5, the purpose of which will later appear. Also fixed to the shaft 10 is a trip arm 13 the upper end of which is provided with a projection 14 which is located in the path of movement of the pointer 3. It will thus be seen that when the pointer moves to an overload position that the projection 14 will be engaged whereby the shaft 10 will be rocked to move the target 12 from its normal position into registration with the opening 9.

In order to reset the target it is necessary that the arm 11 be rocked in a counter clockwise direction, and in order to accomplish this the lens 15 of the instrument is drilled to provide an opening 16 in which is fitted a sleeve 17, and journaled in said sleeve is a shaft 18.

The sleeve 17 is retained in the opening by clamping nuts 19—19, and interposed between the nuts and faces of the lens are packing washers 20—20.

The outer end of the shaft 18 carries a turning knob 21 while the inner end has fixed thereto an arm 22 having a lateral extension 23 upon its upper end which is adapted to engage the lower end of the arm 11 to swing the same in order that the target 12 will swing out of registration with the opening 9.

A coil spring 24 encircles the inner ends of the sleeve 17 and has one end fixed to the inner nut 19, while the other end thereof terminates in a finger 25 adapted to yieldably bear against the arm 22 so as to hold the same against the pin 26 carried by the inner nut, said pin obviously limiting the swinging movement of the arm 22 in one direction.

It will be apparent that when the pointer 3 moves to the extreme right it will strike the projection 14 thereby rocking the arm 11 to the position as shown in Figure 5 and at which time the target 12 will coincide with the opening 9 to indicate that an overload has occurred in the circuit. To reset the target the knob 21 is turned clockwise in order to swing the arm 22 to cause the finger 23 to engage the lower end of the arm 11 to swing the same to a position as shown in Figure 4 and at which time the target is concealed by the plate 8. When the shaft 17 is rotated clockwise the spring 24 will contract and upon releasing the knob expansive action of the spring will rotate the shaft anti-clockwise to swing the arm 22 to its normal or inoperative position, the reverse swinging movement of the arm being limited by the pin 26.

If desired an alarm may be incorporated in the circuit and will operate to indicate that the arm has been swung to full line position of the scale.

From the foregoing, it is thought that the construction, operation and many advantages of the herein described invention will be apparent to those skilled in the art, without further description, and it will be understood that various changes in the size, shape, and proportion and minor details of construction, may be resorted to without departing from the spirit or sacrificing any of the advantages of the invention.

What is claimed is:—

1. The combination with the pivotally mounted pointer of a measuring instrument, of a target associated therewith, a plate having a sight opening therein, and means operable by the pointer when swung in one direction for shifting the target in direct registration with the sight opening.

2. The combination with the pointer of a measuring instrument, of a frame having a sight opening therein, a shaft rotatably supported by the frame, an arm fixed to the shaft and having a target upon its upper end, and a trip arm carried by the shaft for engagement with the pointer when moved in one direction to rock the shaft to move the target into registration with said opening.

3. The combination with the pointer of a measuring instrument, of a frame having a sight opening therein, a shaft rotatably supported by the frame, an arm fixed to the shaft and having a target upon one end, means carried by the shaft for actuation by the pointer when moved in one direction to rock the shaft to move the target into registration with the said opening, and manually operable means rotatably supported by the instrument for engaging the arm to rock the same to move the target from registration with said opening.

4. The combination with the pointer of a measuring instrument, of a frame carried by the instrument and having a sight opening therein, a shaft rotatable in the frame, an arm fixed to the shaft and having a target upon its upper end, a trip arm fixed to the shaft, and means carried by the trip arm for engagement with the pointer to rock the shaft to move the target into registration with said opening.

5. The combination with the pointer of a measuring instrument, of a frame carried by the instrument, said frame having a sight opening formed therein, a shaft journaled in the frame and having an arm fixed thereto, a target carried by the arm, a trip arm fixed to said shaft and having a projection upon its upper end in the path of movement of the pointer, said projection being engageable with the pointer when the pointer is moved in one direction to rock the trip arm and thus the shaft to move the target into registration with the sight opening.

6. The combination with the pointer of a measuring instrument, of a frame carried by the instrument and having a sight opening formed therein, a shaft journaled in the frame and having an arm fixed thereto, a target carried by the upper end of the arm, a trip arm fixed to said shaft and having a projection upon its upper end, said projection being adapted to be engaged by the pointer when said pointer is moved in one direction, whereby the trip arm rocks the shaft to move the target into registration with the sight opening, a shaft rotatably supported by the instrument and having an arm fixed thereto for engagement with the first named arm to rock the same in a direction to move the target from registration with the sight opening.

7. The combination with the pointer of a measuring instrument, of a frame carried by the instrument and having a sight opening formed therein, an arm pivotally supported by the frame, and having a target upon one end, means operable by the pointer for rocking the arm for moving the target into registration with the opening when the pointer moves in one direction, a shaft carried by the instrument and having an arm carried thereby for engagement with the first named arm to swing the same in the reverse direction to move the target from registration with the opening, and yieldable means for returning the last named arm in its inoperative position.

In testimony whereof I affix my signature.

CLYDE A. MULLEN. [L. S.]